(12) United States Patent
Owen

(10) Patent No.: US 10,641,236 B2
(45) Date of Patent: May 5, 2020

(54) SUBMERSIBLE HYDROELECTRIC GENERATOR APPARATUS AND A METHOD OF EVACUATING WATER FROM SUCH AN APPARATUS

(71) Applicant: McElroy Owen, Swords (IE)

(72) Inventor: McElroy Owen, Swords (IE)

( * ) Notice: Subject to any disclaimer, the term of this patent is extended or adjusted under 35 U.S.C. 154(b) by 1123 days.

(21) Appl. No.: 14/890,112

(22) PCT Filed: May 12, 2014

(86) PCT No.: PCT/EP2014/059656
§ 371 (c)(1),
(2) Date: Nov. 9, 2015

(87) PCT Pub. No.: WO2014/180995
PCT Pub. Date: Nov. 13, 2014

(65) Prior Publication Data
US 2016/0084219 A1   Mar. 24, 2016

(30) Foreign Application Priority Data

May 10, 2013 (GB) .................................. 1308416.5

(51) Int. Cl.
*F03B 15/14* (2006.01)
*F03B 17/00* (2006.01)
(Continued)

(52) U.S. Cl.
CPC ................ *F03B 15/14* (2013.01); *F03B 3/12* (2013.01); *F03B 11/004* (2013.01);
(Continued)

(58) Field of Classification Search
CPC .......... F03B 15/14; F03B 15/16; F03B 15/00; F03B 15/12; F03B 15/005; F03B 15/04;
(Continued)

(56) References Cited

U.S. PATENT DOCUMENTS

2009/0140525 A1   6/2009 Deangeles
2009/0230687 A1   9/2009 Robichaud
(Continued)

OTHER PUBLICATIONS

International Search Report issued in counterpart International Application Serial No. PCT/EP2014/059656 on Sep. 22, 2015 by the European Searching Authority.

*Primary Examiner* — Ninh H. Nguyen
*Assistant Examiner* — Jason Mikus
(74) *Attorney, Agent, or Firm* — Brian J. Colandreo; Michael T. Abramson; Holland & Knight LLP

(57) ABSTRACT

This invention relates to a submersible hydroelectric generator apparatus (1) and a method of evacuating water from such an apparatus. The method of evacuating water from a submersible hydroelectric generator apparatus (1) comprising the steps of pressurizing a fluid supply in the submersible hydroelectric generator apparatus using the water flowing into the apparatus and thereafter using the thus-pressurized fluid supply to evacuate the water from the apparatus. Additional pressurized fluid can be supplied to provide a pressurized fluid supply with sufficient pressure to expel the water from the apparatus. The apparatus (1) can be used in a grid connected electricity generating system or indeed in a smaller scale implementation such as in a single building or group of buildings to provide electricity to those buildings. The invention overcomes problems with prior art devices by evacuating water from the apparatus in an efficient manner.

22 Claims, 10 Drawing Sheets

(51) Int. Cl.
*F03B 3/12* (2006.01)
*F03B 11/00* (2006.01)
*F03B 11/02* (2006.01)
*F03B 13/10* (2006.01)

(52) U.S. Cl.
CPC ............ *F03B 11/008* (2013.01); *F03B 11/02* (2013.01); *F03B 13/10* (2013.01); *F03B 17/005* (2013.01)

(58) Field of Classification Search
CPC .......... F03B 15/20; F03B 17/02; F03B 13/12; F03B 13/14
See application file for complete search history.

(56) References Cited

U.S. PATENT DOCUMENTS

2011/0260459 A1 10/2011 Rovinsky
2011/0260460 A1* 10/2011 Rovinsky ................ F03B 13/10
290/54

* cited by examiner

SUBMERSIBLE HYDROELECTRIC GENERATOR APPARATUS AND A METHOD OF EVACUATING WATER FROM SUCH AN APPARATUS

CROSS-REFERENCE TO RELATED APPLICATIONS

The subject application is a U.S. National Stage application of International Application No. PCT/EP2014/059656, filed on May 12, 2014, which claims the priority of Great Britain Patent Application No. 1308416.5, filed May 10, 2013. The contents of both applications are herein incorporated by reference in their entirety.

TECHNICAL FIELD

This invention relates to a submersible hydroelectric generator apparatus and a method of evacuating water from such an apparatus.

BACKGROUND ART

For many years now, there has been a trend away from the use of fossil fuels and towards renewable energy supplies for electricity generation. Fossil fuel supplies such as coal, oil and gas are depleting rapidly and the burning of fossil fuels is thought to be harmful to the environment. Renewable energy supplies such as wind, wave, tidal and solar supplies are effectively infinite and are not thought to cause as much harm to the environment. Accordingly, there is a continual shift towards these renewable energy supplies as they are sustainable and believed to be less detrimental to the environment.

However, there are some problems with many of the known renewable energy supplies and the apparatus for harnessing the renewable energy supplies. For example, wind power is deemed practical only in those areas that experience reliable, predictable winds above a certain wind strength all year round. The wind turbines used to harness the power of the wind are thought to be relatively noisy and it is undesirable to locate so-called "wind farms" near populated areas. Therefore, there are many areas where it is not possible or desirable to locate wind farms.

Furthermore, in relation to wave and tidal power, it goes without saying that these forms of renewable energy supplies require a coastline and access to the sea or an ocean in order to operate. It is thought in many quarters that wave and tidal renewable energy supplies are still several years away from being economically viable alternatives to fossil fuels. Accordingly, these renewable energy supplies are not available everywhere and even in those areas where they are available, they are not necessarily commercially attractive. Solar energy apparatus efficiency have improved and their price have dropped so that they are realistic alternatives to fossil fuels. However in order to derive these benefits, it is still necessary to have a high degree of sunlight all year round. Therefore, solar energy is not a realistic alternative in all locations.

One form of renewable energy supply that is becoming increasingly popular and attracting more attention is hydroelectric power generation that uses underwater "waterfalls" to generate the electricity. The advantage of this type of renewable energy supply is that it simply requires a body of water, even a lake or a pond, man-made or naturally occurring, and does not rely on waves, tidal flow or other climactic conditions to operate. Generally speaking, these devices comprise a generator with a turbine that is submerged under the water. Water from above is dropped onto the turbine causing the turbine to rotate and this movement is translated into electricity. The water that has been used to turn the turbine is released from the generator back into the body of water and recirculated. Therefore, there is an endless, continuous supply of electricity that may be produced from operating such a generator.

One apparatus for harnessing this energy and producing electricity is described in US patent application no. US200910230687 in the name of Robichaud, hereinafter referred to simply as Robichaud. Another apparatus for harnessing this energy and producing electricity is described in US patent application no. US2011/0260460 in the name of Rovinsky, hereinafter referred to as Rovinsky.

One common problem of all these devices is how to efficiently evacuate water that has passed over the turbine from the apparatus. If the water is allowed to dwell or build up in the apparatus, the turbine will eventually become flooded and will no longer rotate. Indeed, Rovinsky specifically mentions this as a problem of the corkscrew arrangement used to evacuate water from the apparatus disclosed in Robichaud. Rovinsky states that the corkscrew arrangement of Robichaud will be insufficient to remove the water from below the turbine. Rovinsky discloses several different arrangements for evacuating water from the apparatus.

It is an object of the present invention to provide a submersible hydroelectric generator apparatus and method of operating same that overcomes at least some of the problems with the known prior art. More specifically, it is an object of the invention to provide an apparatus and method that can effectively evacuate water from the apparatus. It is a further still object of the present invention to provide a useful choice for the consumer.

SUMMARY OF INVENTION

According to the invention there is provided a submersible hydroelectric generator apparatus comprising a substantially upright body having an outer chamber and an inner pressure chamber surrounded by and spaced apart from the outer chamber, the inner pressure chamber being in fluid communication with the outer chamber adjacent the lowermost end of the inner chamber, the inner pressure chamber having a pressurizable fluid supply therein, pressurizable by water flowing into the apparatus, the outer chamber having a charging inlet adjacent the top of the upright body, a discharge outlet located adjacent the bottom of the upright body, and a liquid passageway intermediate the charging inlet and the discharge outlet, the liquid passageway having a turbine mounted therein and a flow regulator in the liquid passageway intermediate the turbine and the discharge outlet, and in which there is provided a closure moveable to and from a first position blocking the discharge outlet thereby preventing evacuation of water from the apparatus and a second position opening the discharge outlet thereby permitting evacuation of water from the apparatus, and in which there is provided a controller and a closure actuator capable of moving the closure to and from the first position to and from the second position in response to a control input from the controller.

By having such an apparatus, it will be possible to evacuate the water from the apparatus in a very efficient and effective manner. The water entering the apparatus will be used to pressurise a fluid in the inner pressure chamber. As more and more liquid enters into the apparatus, the pressure on the fluid in the inner pressure chamber will increase. The fluid in the pressure chamber will reach a point that it will be under such pressure that it can be used to evacuate the water from the apparatus by effectively "pushing" the water out through a discharge outlet that has been opened to allow evacuation of water. The apparatus can be placed in any body of water including, but not limited to, the ocean, the sea, a lake, a pond or any man-made pool of water and used to generate electricity. The electricity can be produced practically continuously as the water is expelled from the apparatus into the body of water and can be reused in the apparatus. It is envisaged that the apparatus can be used alone or in groups to provide electricity to a national or regional power grid or indeed could be installed in the basement of a building and used to provide electricity to that building.

In one embodiment of the invention there is provided a submersible hydroelectric generator apparatus in which there is provided an auxiliary pressurized fluid supply to supplement the pressurizable fluid supply. It is envisaged that in certain cases, it may be preferable or necessary to supplement the fluid supply that has been pressurized by the water entering the apparatus and this will ensure that the water is evacuated from the apparatus efficiently.

In one embodiment of the invention there is provided a submersible hydroelectric generator apparatus in which there is provided a compressor to provide the auxiliary pressurized fluid supply.

In one embodiment of the invention there is provided a submersible hydroelectric generator apparatus in which the compressor is powered by some of the electricity generated by the turbine. This is seen as a particularly useful aspect of the invention as the incoming water, as well as pressurizing the fluid supply, will also be used to pressurize the auxiliary fluid supply through the compressor.

In one embodiment of the invention there is provided a submersible hydroelectric generator apparatus in which there are provided a plurality of turbines.

In one embodiment of the invention there is provided a submersible hydroelectric generator apparatus in which there are provided a plurality of liquid passageways, each having a turbine therein.

In one embodiment of the invention there is provided a submersible hydroelectric generator apparatus in which the plurality of turbines are spaced circumferentially around the outer chamber.

In one embodiment of the invention there is provided a submersible hydroelectric generator apparatus in which the flow regulator comprises a sump located in the liquid passageway below the turbine. This is seen as a preferred implementation of the present invention. By providing a sump, the flow of water coming into the apparatus does not have to be stopped when the water is being evacuated from the apparatus. Instead, the incoming water can be temporarily stored in the sump. When the water has been evacuated, this water in the sump may be released and allowed to travel towards the discharge outlet and the inner pressure chamber.

In one embodiment of the invention there is provided a submersible hydroelectric generator apparatus in which the flow regulator comprises a valve operable to selectively block passage of water through the liquid passageway. This is also seen as a preferred embodiment of the invention. The valve, which can be a non-return valve or a simple flap that can be controllably moved into or out of position blocking or freeing the liquid passageway, will prevent water from being pushed upwards through the liquid passageway in the direction of the turbine and will not allow the turbine to become flooded.

In one embodiment of the invention there is provided a submersible hydroelectric generator apparatus in which there is provided a turbine mounted in line with the discharge outlet of the apparatus. By providing a further turbine in this position, the further turbine can harness the energy from the flow of water that is being expelled from the apparatus. This flow will almost certainly be periodic but it is envisaged that it may still be worthwhile harnessing.

In one embodiment of the invention there is provided a submersible hydroelectric generator apparatus in which there is provided a ram mounted in the inner pressure chamber operable to evacuate water from the apparatus.

In one embodiment of the invention there is provided a submersible hydroelectric generator apparatus in which the ram is powered by some of the electricity generated by the turbine.

In one embodiment of the invention there is provided a submersible hydroelectric generator apparatus in which there is provided a pressure sensor in communication with the controller, the pressure sensor being operable to measure the pressure of the pressurizable fluid supply in the inner pressure chamber. By having a pressure sensor, the apparatus can ensure that the pressure of the fluid in the inner pressure chamber will be sufficient to expel the water from the apparatus. The discharge outlet will only be opened upon the correct pressure being reached in the inner pressure chamber. Furthermore, the pressure sensor can be used to ensure that the correct amount of additional fluid from the auxiliary fluid supply is provided, if necessary, to ensure that the pressure in the inner chamber is adequate to expel the water from the inner pressure chamber of the apparatus.

In one embodiment of the invention there is provided a submersible hydroelectric generator apparatus in which the apparatus comprises a two-part construction:
  the first part comprising the inner pressure chamber and a substantial portion of the outer chamber including the discharge outlet and a portion of the liquid passageway that is in communication with the discharge outlet;
  the second part being releasably detachable from the first part and containing the charging inlet, the turbine and a portion of the liquid passageway that is in communication with the charging inlet;
  both the first part and the second part each having a linking aperture therein for communication with the linking aperture of the other of the first and second part to connect the portions of the liquid passageway together and complete the fluid passageway.

This two-part construction is seen as particularly useful as the second part can be removed for servicing or repair while the remainder of the apparatus can continue operating as intended. Furthermore, this may facilitate installation, transportation and construction.

In one embodiment of the invention there is provided a submersible hydroelectric generator apparatus in which the apparatus is constructed predominantly from a polymer material.

In one embodiment of the invention there is provided a submersible hydroelectric generator apparatus in which there is provided a release valve in the inner chamber to allow evacuation of at least some of the pressurizable fluid supply from the inner chamber. This is seen as a useful aspect of the present invention. It is envisaged that in some circumstances, it may be desirable or necessary to evacuate at least some of the pressurizable fluid from the inner pressure chamber to speed up the ingress of water into the inner pressure chamber. In those cases, additional supplementary pressurized fluid may be required to evacuate the water from the apparatus.

In one embodiment of the invention there is provided a submersible hydroelectric generator apparatus in which there is provided a tank connected to the release valve to receive the pressurizable fluid supply evacuated from the inner chamber. Alternatively, the pressurizable fluid may be exhausted to the external atmosphere however it may be preferable to harvest the pressurizable fluid rather than allowing it to be exhausted from the apparatus and a tank is a useful way of harvesting the pressurizable fluid.

In one embodiment of the present invention there is provided a submersible hydroelectric generator apparatus in which the tank is located intermediate the inner pressure chamber and the outer chamber.

In one embodiment of the present invention there is provided a submersible hydroelectric generator apparatus in which there is provided a pressure vessel operable to promote flow of a fluid through the apparatus. This is seen as another useful aspect of the present invention, a pressure vessel may be a vessel able to provide a positive pressure or alternatively, the pressure vessel may be a vessel able to provide a negative pressure. The positive or the negative pressure exerted by the pressure vessel, depending on its location in the apparatus, can be used to promote ingress of water into the inner pressure chamber from the second part of the apparatus or indeed may be used to promote expulsion of water or pressurizable fluid from the inner pressure chamber.

In one embodiment of the invention there is provided a method of evacuating water from a submersible hydroelectric generator apparatus comprising the steps of: pressurizing a fluid supply in the submersible hydroelectric generator apparatus using the water flowing into the apparatus and thereafter using the thus-pressurized fluid supply to evacuate the water from the apparatus.

This is seen as a particularly effective way of evacuating water from the apparatus. The water will effectively be used to compress a fluid supply, preferably a gas such as, but not limited to, air, in the inner pressure chamber. As the pressure on this gas in the inner pressure chamber increases, it will build to a point where there is sufficient pressure on the gas to expel the water from the apparatus. In this way, there is provided a very efficient way of expelling water from the apparatus and ensuring that the apparatus remains relatively "dry" so that the turbine will not become flooded.

In one embodiment of the invention there is provided a method comprising the step of adding pressurized fluid from an auxiliary pressurized fluid supply to the pressurized fluid supply.

In one embodiment of the invention there is provided a method comprising the steps of using the water flowing into the apparatus to operate a turbine from which electricity is generated and thereafter using some of the thus-generated electricity to power a compressor operable to compress fluid in the auxiliary pressurized fluid supply.

In one embodiment of the invention there is provided a method comprising the steps of monitoring the pressure of the fluid pressurized by the water flowing into the apparatus and on the fluid reaching a pre-determined pressure, temporarily opening a discharge aperture in the apparatus to allow evacuation of the water therethrough.

In one embodiment of the invention there is provided a method comprising the steps of using the water flowing into the apparatus to operate a turbine from which electricity is generated and thereafter using some of the thus-generated electricity to power a ram mounted in the apparatus and operable to assist in the evacuation of water from the apparatus.

In one embodiment of the invention there is provided a method comprising the step of, when water is being discharged from the apparatus, limiting the flow of further incoming water through the apparatus.

In one embodiment of the invention there is provided a method in which the step of limiting flow of further incoming water through the apparatus comprises temporarily storing the water in a sump located below and spaced apart from the turbine.

In one embodiment of the invention there is provided a use of the submersible hydroelectric generator apparatus as a pump to pump a liquid from one location to another.

In one embodiment of the invention there is provided a use of the submersible hydroelectric generator apparatus as a propulsion device to propel a waterborne craft from one location to another.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1:
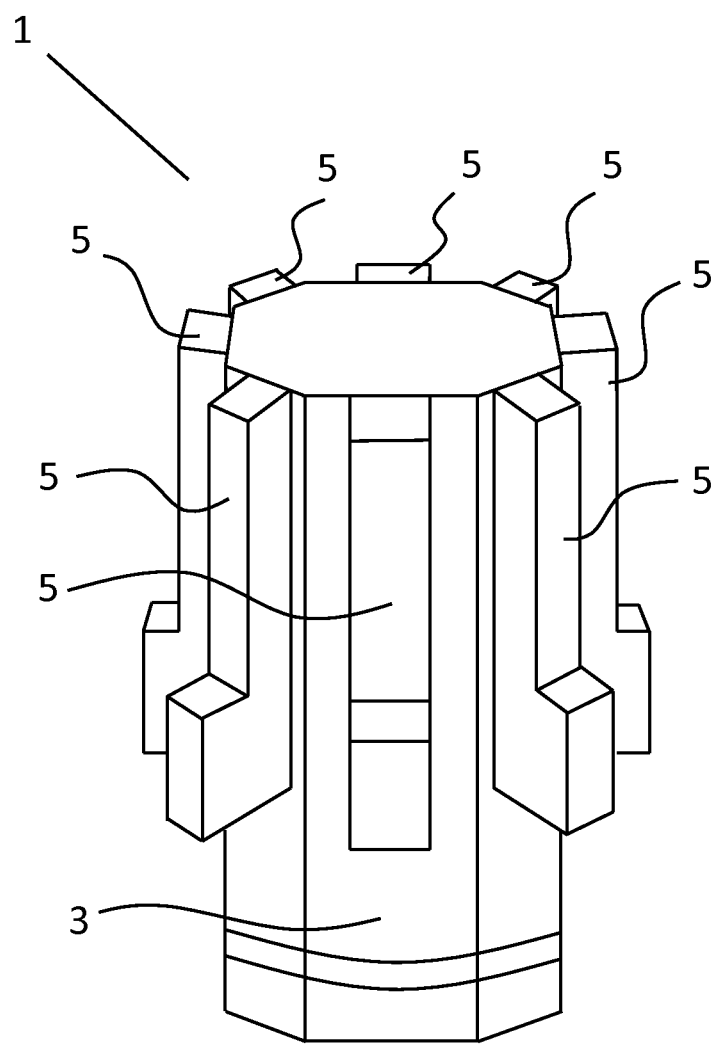
FIG. 1 is a perspective view of a submersible hydroelectric generator apparatus according to the invention.
Figure 2:
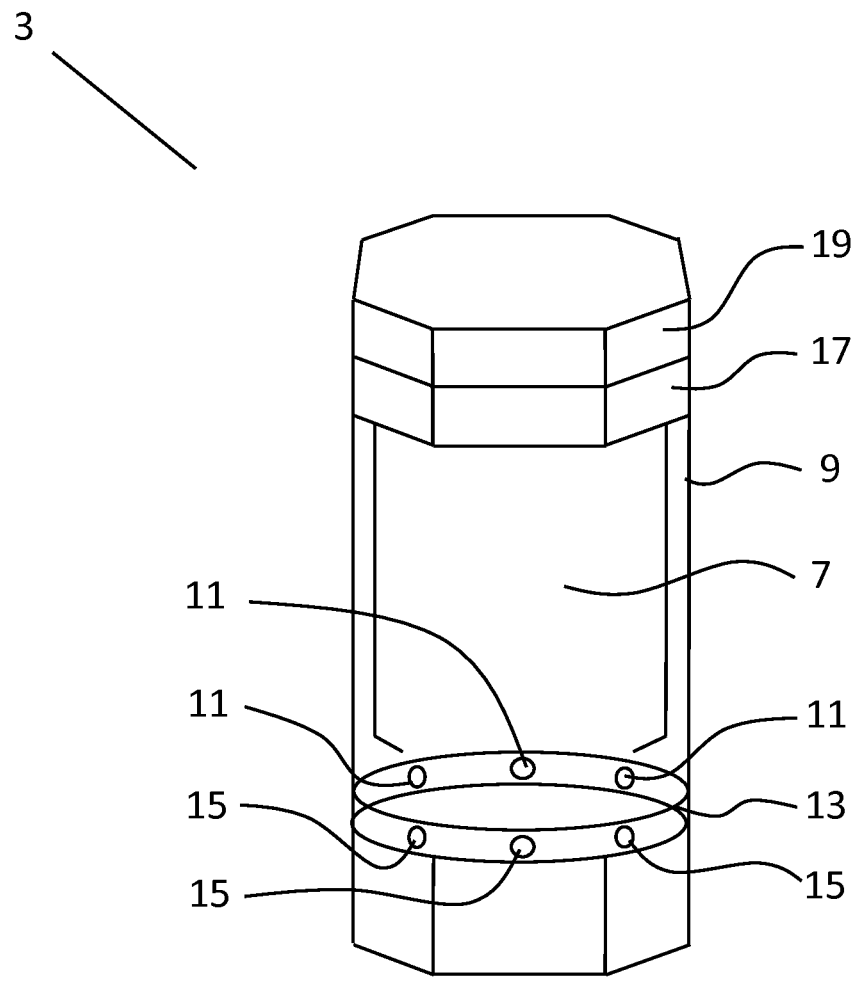
FIG. 2 is a perspective, part cross-sectional view of a first part of the submersible hydroelectric generator apparatus.
Figure 3:
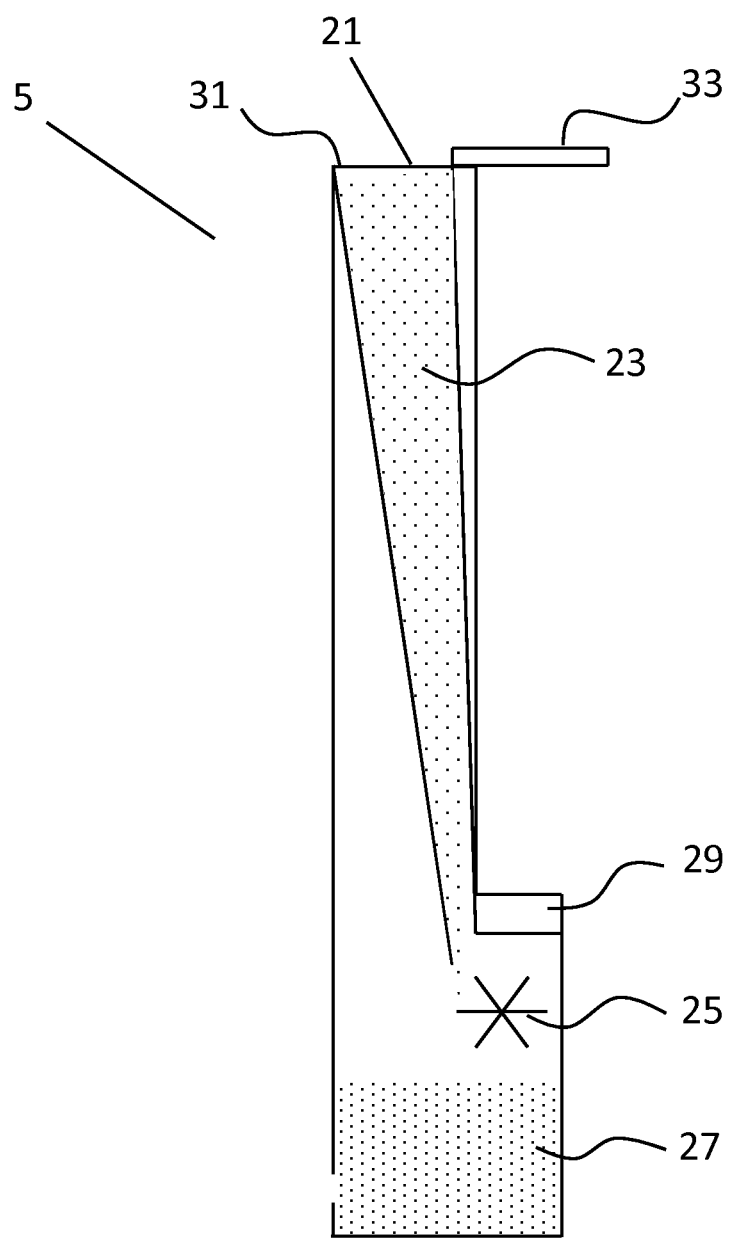
FIG. 3 is a side cross-sectional view of a second part of the submersible hydroelectric generator apparatus.

Referring to FIGS. 1 to 3, and initially specifically to FIG. 1, there is shown a submersible hydroelectric generator apparatus, indicated generally by the reference numeral 1, comprising a first part 3 and a second part 5 mounted on the first part. In the embodiment shown, the first part 3 is an octagonal cylinder and there are provided eight second parts 5, one on each side of the octagonal cylinder, mounted on the first part 3.

Referring specifically to FIG. 2, the first part comprises an inner pressure chamber 7 and an outer chamber 9 surrounding and spaced apart from the inner pressure chamber 7. There are provided a plurality of discharge apertures 11 located adjacent the base of the outer chamber 9 and a closure member, in this case provided by way of an annular ring 13. The annular ring 13 is rotatably mounted on the outer chamber 9 and has a plurality of apertures 15 formed therein. As the annular ring 13 is rotated around the outer chamber, the apertures 15 will align with the discharge apertures 11. Further rotation of the ring 13 or rotation of the ring 13 in the opposite direction will bring the apertures 15 out of alignment with the apertures 11 thereby closing off the discharge apertures 11. The portion of the first part on which the annular ring sits will be cylindrical in shape rather than octagonal in shape to allow rotation of the annular ring about the first part. The first part further comprises a compressed air tank 17 and a transformer and compressor compartment 19 above the inner pressure chamber 7.

Referring specifically to FIG. 3, the second part 5 comprises a charging aperture 21 and a liquid passageway 23 internal the second part 5. A turbine 25 is mounted in the liquid passageway 23 and there is provided a sump 27 below and spaced apart from the turbine in the liquid passageway for collecting water coming down the liquid passageway 23 over the turbine 25. The second part comprises a generator/alternator compartment 29 with a generator/alternator (not shown) therein in communication with the turbine 25 to transform the rotational movement of the turbine 25 into electricity. The charging aperture 21 is preferably provided with an intake grill 31 to prevent large foreign objects entering into the liquid passageway and there is provided a closure 33 for the charging aperture 21 that may be moved over the charging aperture to prevent intake of water into the liquid passageway.

Figure 4:
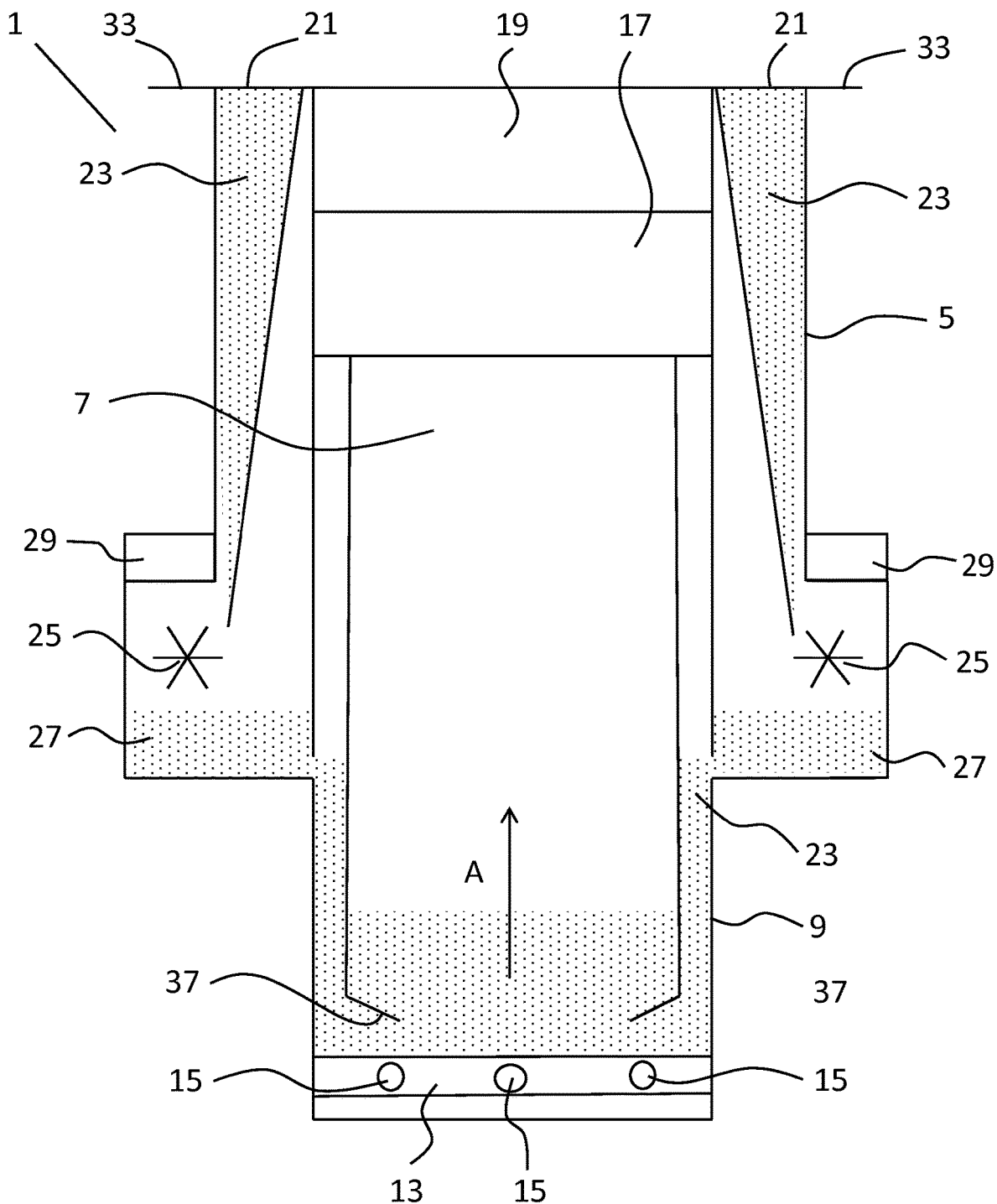
FIGS. 4 to 7 inclusive are side cross-sectional views of the submersible hydroelectric generator apparatus during operation.

Referring to FIGS. 4 to 7 inclusive, there is shown a plurality of views of the submersible hydroelectric generator apparatus 1 according to the invention in operation. Referring first of all to FIG. 4, it can be seen that when the first part 3 and the second part 5 are joined together, the liquid passageway 23 is not located solely in the second part 5 but instead the liquid passageway 23 extends all the way from the charging inlet 21 at the top of the second part (which may be considered for the purposes of this specification as the top of the outer chamber 9) down through the second part 5 and into the first part 3 via complementary linking apertures 34 in the first and second parts. The incoming water flows between the outer chamber 9 and the inner pressure chamber 7 down to the discharge apertures 11 at the base of the outer chamber 9 of the first part 3.

In use, in FIG. 4, the charging inlet 21 is open and is submerged below the surface of the body of water in which the submersible hydroelectric generator apparatus is submerged. Water flows into the apparatus through the charging inlet 21 and travels down over a cascade through the liquid passageway 23 and impacts on the turbine 25. This causes the turbine to rotate. The rotational movement of the turbine will be converted into electricity in the generator/alternator housed in the generator/alternator compartment 29 and from there will be passed to the transformer and/or the compressor in the transformer and compressor compartment 19. The water that has passed by the turbine continues to travel through the liquid passageway 23 into the sump 27 and from there will pass through the linking apertures 34 downward through the liquid passageway in the gap between the inner pressure chamber 7 and the outer chamber 9 towards the bottom of the outer chamber 9. The annular ring 13 has been rotated so that the apertures 15 in the annular ring 13 are not aligned with the discharge apertures 11 in the outer chamber and therefore the water cannot escape from the outer chamber.

The outer chamber 9 and the inner pressure chamber 7 are in fluid communication with each other. Effectively, the inner pressure chamber 7 is open at the base and the water entering through the liquid passageway will gather in the bottom of the outer chamber 9 and start to rise up through the inner pressure chamber 7 as indicated by arrow A in FIG. 4. There is a pressurizable fluid supply, indicated by the reference numeral 35, in the inner pressure chamber 7. As the water rises up in the inner pressure chamber 7, the volume of fluid of the pressurizable fluid supply 35, in this case a gas, preferably air, will decrease. As the volume decreases, the pressure on the gas of the pressurizable fluid supply will increase.

Figure 5:
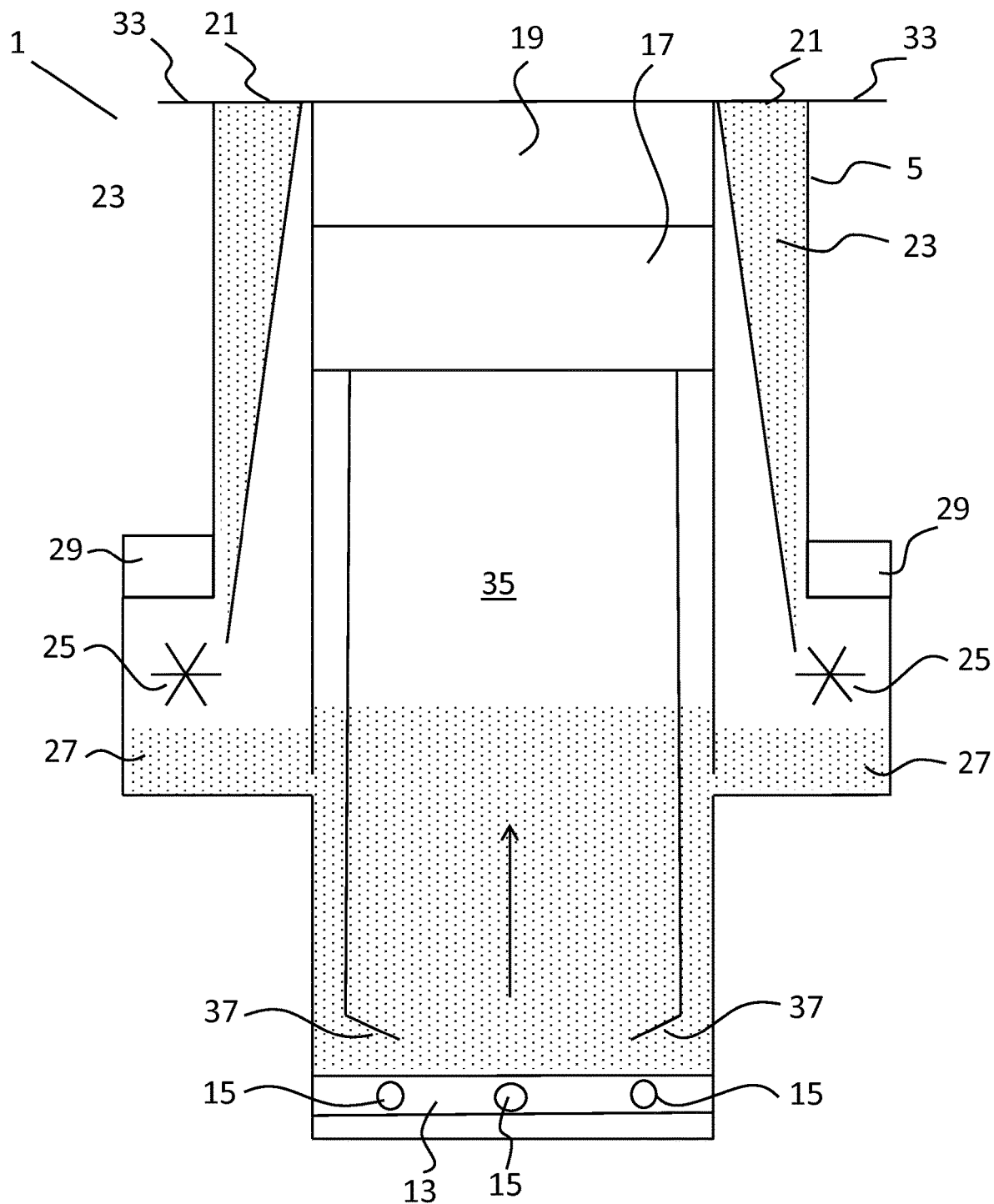

Referring specifically to FIG. 5, the level of water in the inner pressure chamber 7 has risen further thereby further decreasing the volume of gas. It will be understood that as the gas is trapped in the inner pressure chamber 7, the pressure of the gas of the pressurizable fluid supply 35 will be greater than that shown in FIG. 4. In FIG. 5, additional gas from an auxiliary fluid supply 17 is added to the pressurizable fluid supply 35 thereby further increasing the pressure of the pressurizable fluid supply 35 in the inner pressure chamber 7.

Figure 6:
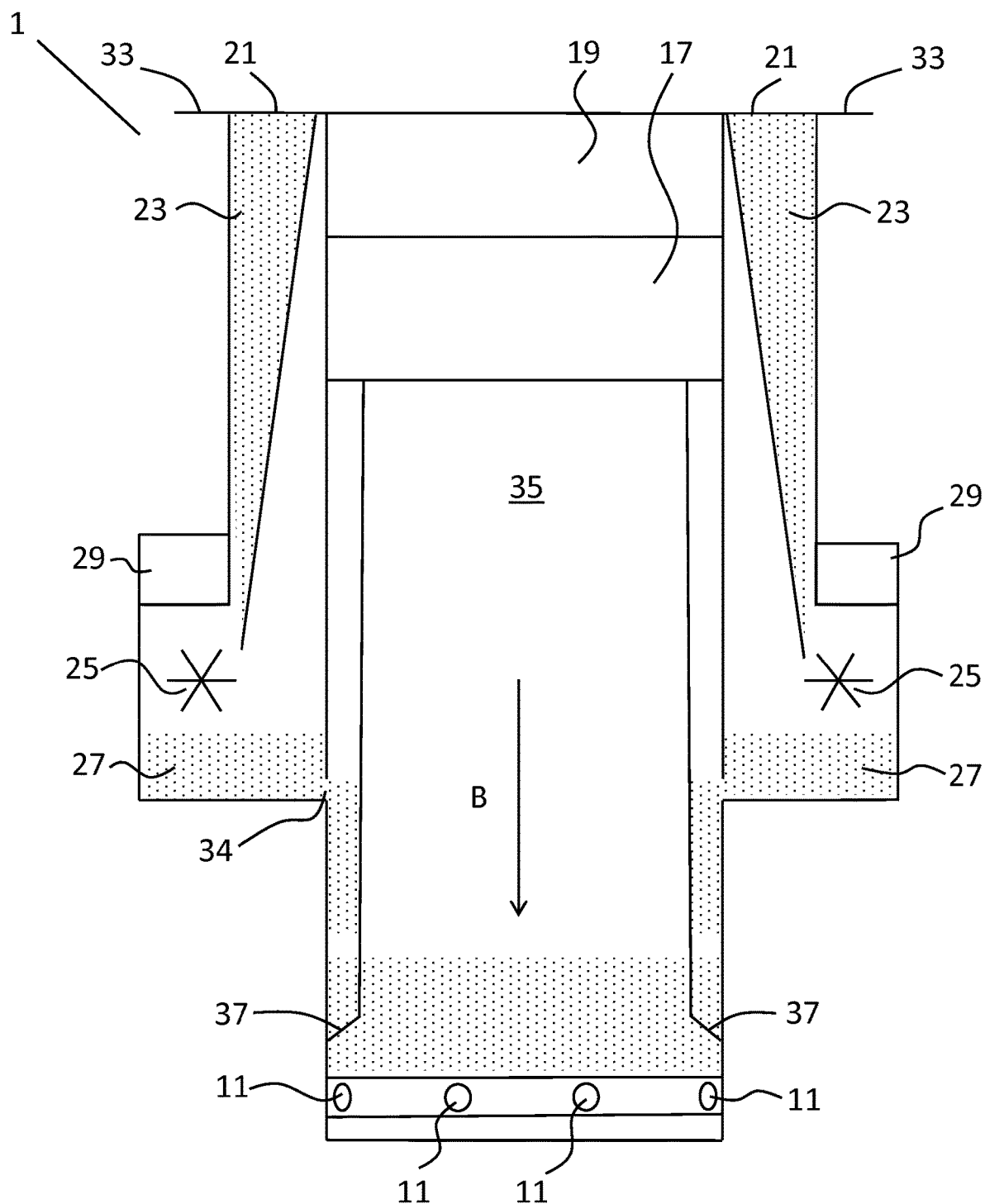

A pressure sensor (not shown) monitors the pressure of the pressurizable fluid supply 35. When the pressure of the pressurizable fluid supply 35 reaches a level sufficient to evacuate the water from the apparatus 1 (i.e. when the pressure exceeds the hydrostatic pressure of the water outside the apparatus), a flow regulator, in this case a valve 37 in the liquid passageway 23, is closed as illustrated in FIG. 6. The valve 37 was previously open (as illustrated in FIGS. 4 and 5), or free of the liquid passageway to allow through-passage of water through the liquid passageway 23, however in the configuration shown in FIG. 6 the valve is closed and is blocking the liquid passageway 23. When the valve is closed, the annular ring 13 is rotated to bring the apertures 15 therein into alignment with the discharge apertures 11. Once the apertures 15 in the annular ring 13 are in alignment with the discharge apertures 11, the pressurized fluid supply 35 will depressurize to an extent and expand and cause the water in the inner chamber to be expelled from the apparatus through the discharge apertures 11, as illustrated by the arrow "B" in FIG. 6. It is envisaged that not all of the water will be discharged from the apparatus to avoid loss of pressurizable fluid supply however a significant portion of the water will be evacuated from the apparatus.

Figure 7:
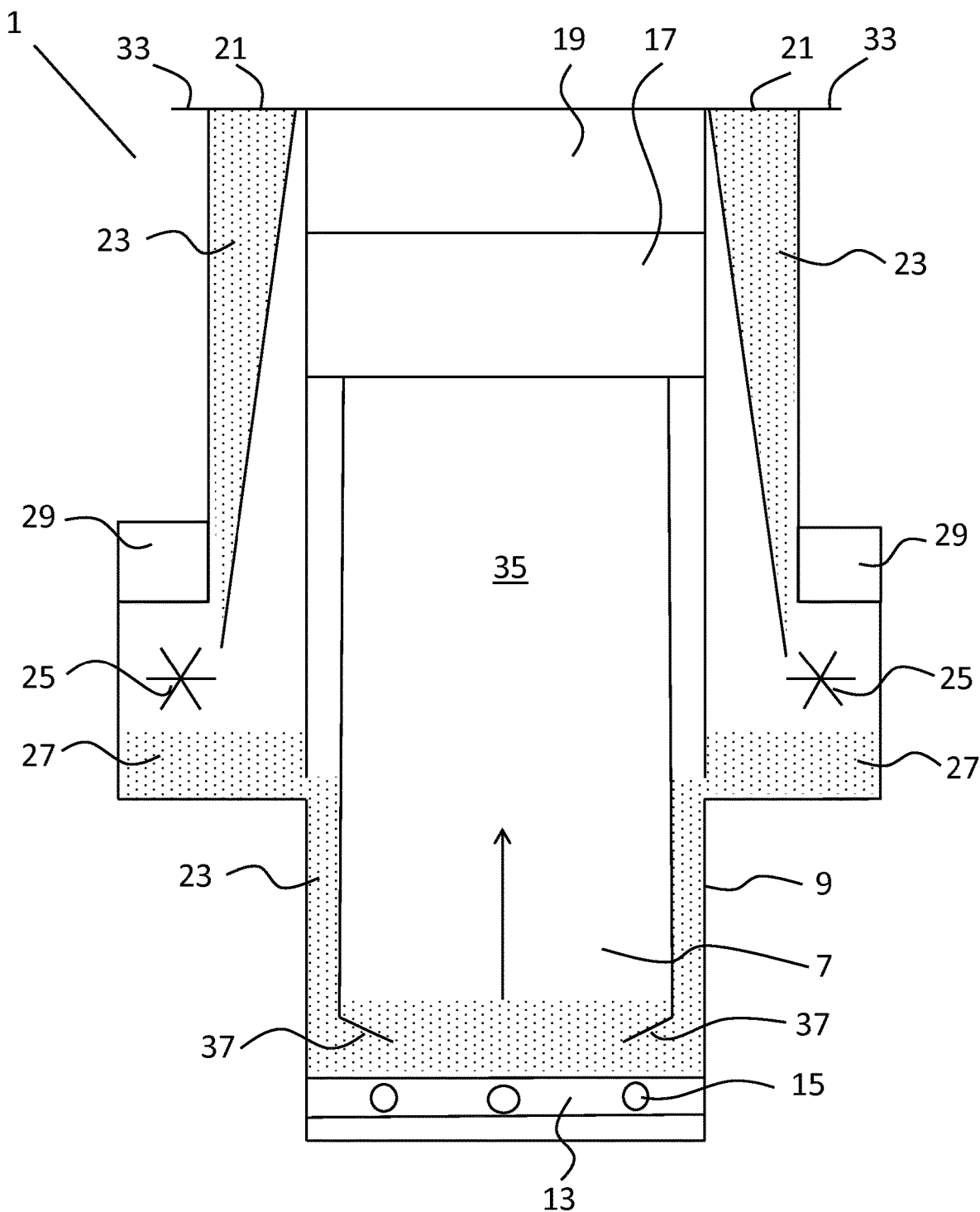

Referring to FIG. 7, when the water has been evacuated from the apparatus 1, the annular ring 13 is rotated once more either in the same direction or in the opposite direction in order to bring the apertures 15 and the discharge apertures 11 out of alignment thereby closing the discharge apertures 11 once more. The flow regulators 37 are returned to their open configuration thereby allowing flow of water down through the liquid passageway 23 and into the inner pressure chamber 7 once more where it will begin to pressurize the pressurizable fluid supply 35 in the inner pressure chamber 7 once more. The process is repeated continuously thereby providing a continuous electricity supply.

It will be understood that when the valve 37 is closed, as illustrated in FIG. 6, the water flowing through the liquid passageway 23 will back up behind the valve 37 and may begin to fill up the sump 27. As soon as the valves 37 are opened once more (as illustrated in FIG. 7), the water built up behind the valve 37 and the water in the sump 27 will flow quickly past the valve 37 and into the inner pressure chamber 7. The timing of the valve's 37 and the annular ring's 13 operation, the amount of additional pressure applied, if appropriate, and the dimensions of the liquid passageway 23 and the sump 27 are chosen so that the turbine 25 is not flooded while the valves 37 are closed and the water is being evacuated from the apparatus 1. As an alternative or in addition to this, closures could be provided to temporarily close or narrow the charging inlets to reduce intake of water while water is being evacuated from the apparatus.

Figure 8:
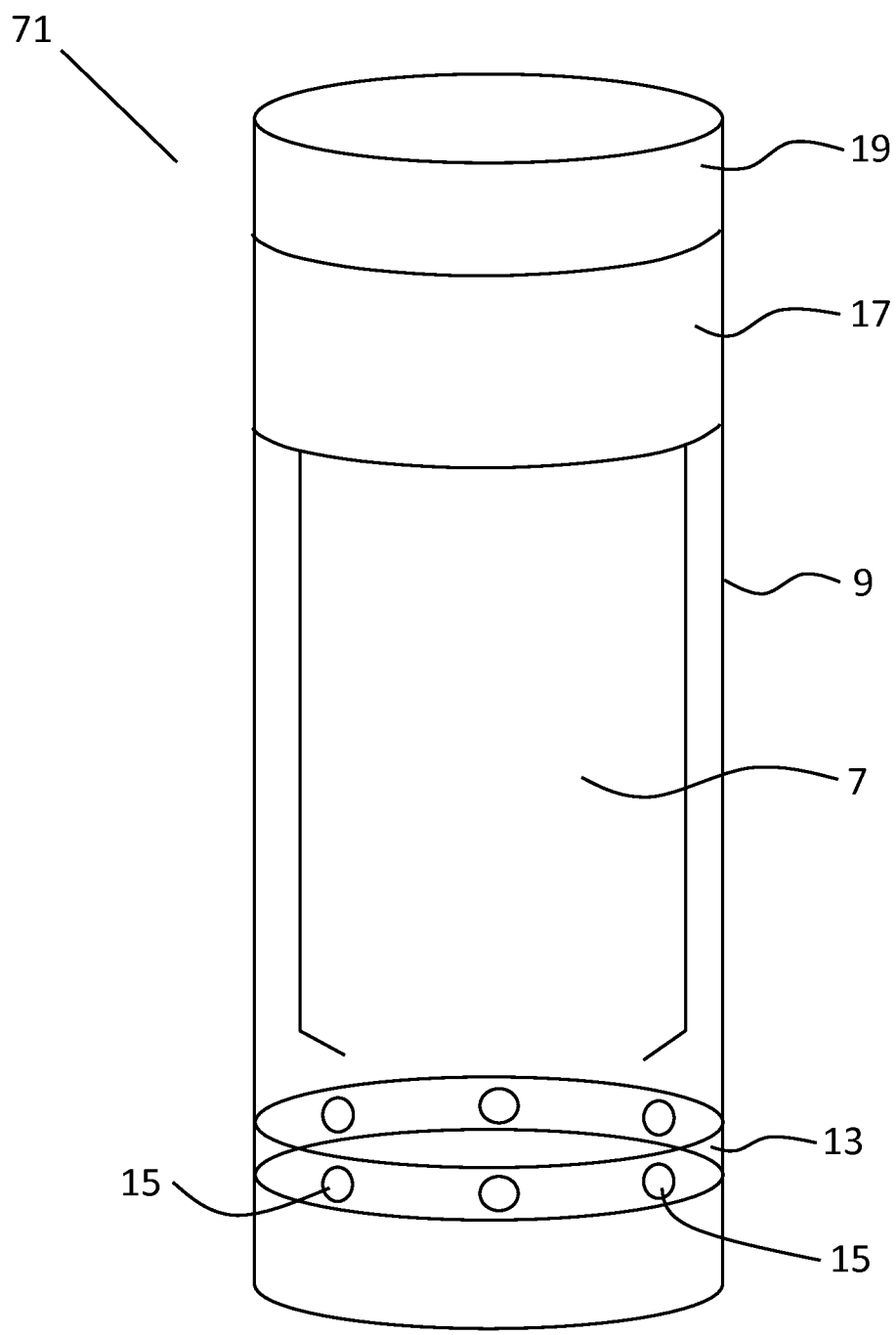
FIG. 8 is a perspective, part cross-sectional view of an alternative embodiment of the first part of the submersible hydroelectric generator apparatus.

Referring now to FIG. 8, there is shown an alternative construction of the first part of the apparatus according to the present invention, indicated generally by the reference numeral 71, where like parts have been given the same reference numeral as before. The first part 71 differs from the previously illustrated first part 3 in that it is substantially cylindrical along its entire height and not simply at the position of the annular ring 13. The second parts 5 will be dimensioned appropriately so that they form a close fit with the curved cylindrical surface.

Figure 9:
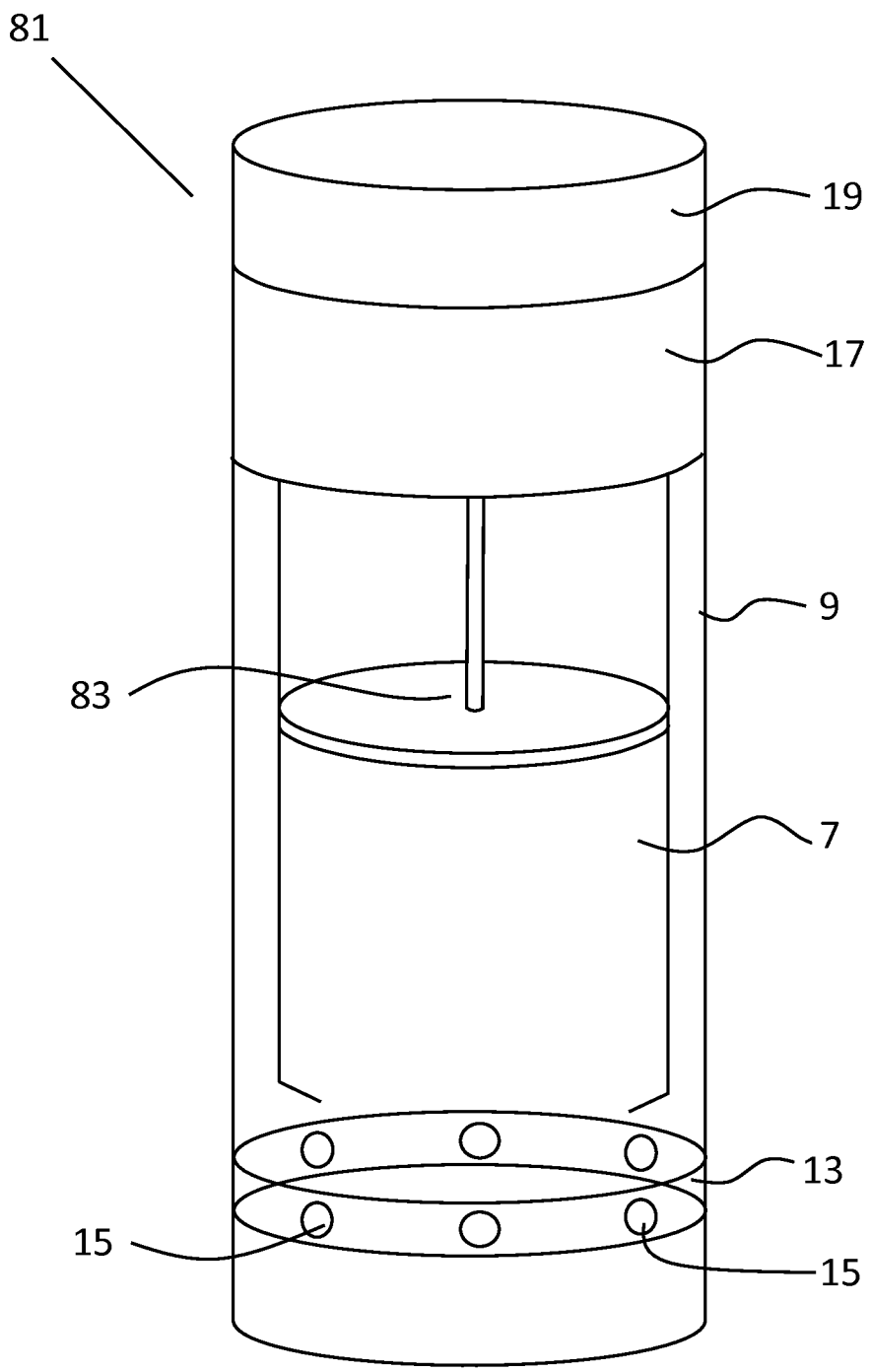
FIG. 9 is a perspective, part cross-sectional view of another alternative embodiment of the first part of the submersible hydroelectric generator apparatus.

Referring to FIG. 9, there is shown a second alternative construction of the first part of the apparatus according to the present invention, indicated generally by the reference numeral 81, where like parts have been given the same reference numeral as before.

The second alternative embodiment of the first part of the apparatus differs from the embodiment shown in FIG. 8 in that there is provided a piston 83 mounted in the inner pressure chamber. When it is time to expel the water from the inner pressure chamber, the piston 83 will be driven downwardly providing further impetus to the water and forcing the water out of the inner pressure chamber and the apparatus faster than might otherwise be the case.

Figure 10:
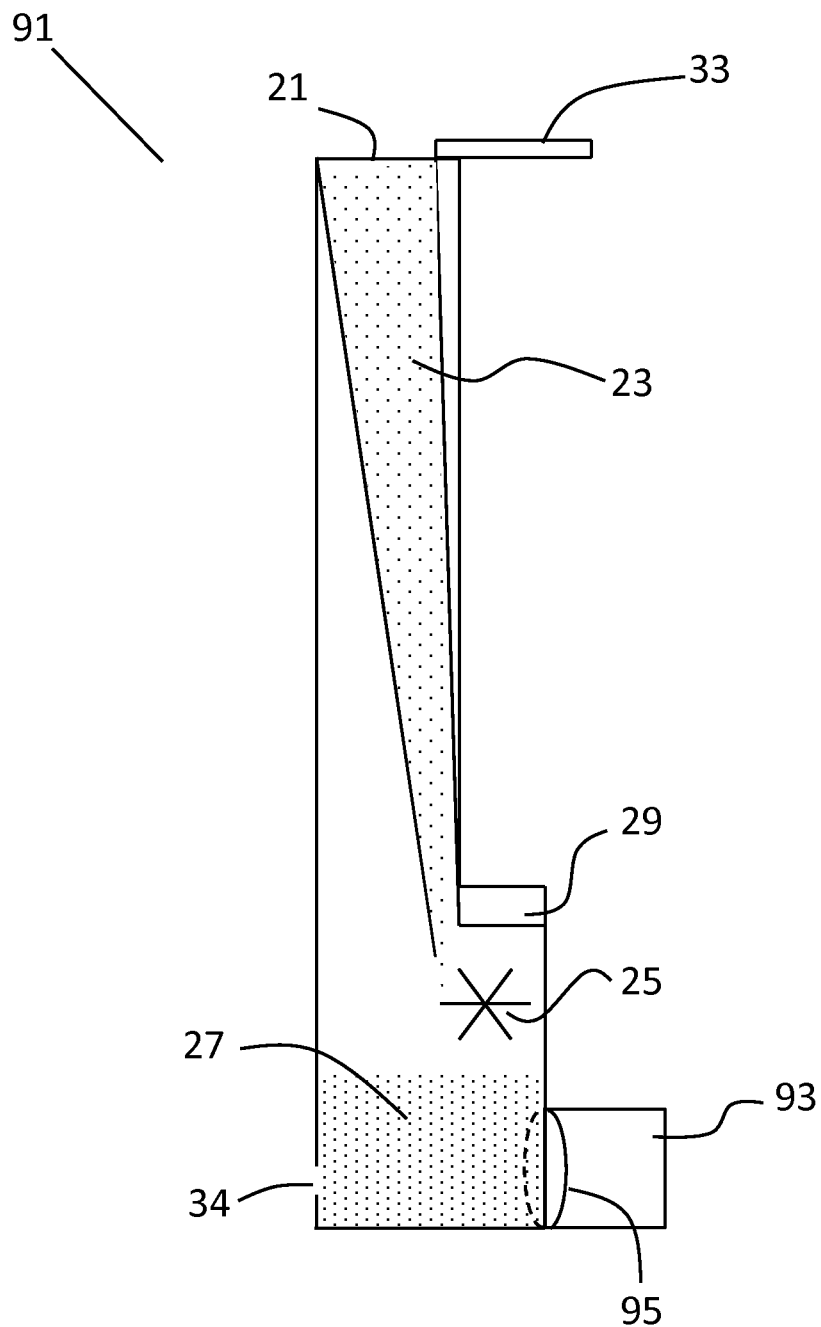
FIG. 10 is a side, cross-sectional view of an alternative embodiment of the second part of the submersible hydroelectric generator apparatus.

Referring to FIG. 10, there is shown an alternative embodiment of the second part of the apparatus according to the invention, indicated generally by the reference numeral 91, where like parts have been given the same reference numeral as before. The second embodiment 91 of the second part of the apparatus differs from the previously described embodiment in that there is provided a pressure vessel, indicated generally by the reference numeral 93 mounted on the second part adjacent the sump. The pressure vessel comprises a diaphragm 95 and means (not shown) to move the diaphragm to and from the position shown in solid line and the alternative position shown in dashed outline. The means to move the diaphragm to and from these positions may be a ram, a blower or a vacuum device. The purpose of the pressure vessel is to speed up the expulsion of water from the sump and speed up the filling of the inner pressure chamber with water. As the diaphragm moves outwardly to the dashed line position from the solid line position it will push the water in front of the diaphragm along the liquid passageway and towards the inner pressure chamber.

It is envisaged that other pressure vessels located elsewhere may also be employed to equally good effect. For example, there may be a vacuum pressure vessel in communication with the interior of the inner pressure chamber that is operable to withdraw air or pressurizable fluid from the inner pressure chamber and encourage faster ingress of water into the inner pressure chamber due to the partial vacuum that thereafter exists in the inner pressure chamber. Similarly, a blower or other pressure vessel may be employed to expel the water out of the inner pressure chamber when it is desired to do so.

The advantage of this invention over the existing Prior Art is its ability to remove the "dead" water from the machine in a speedy and efficient manner. Essentially, the momentum and mass of the water passing through the turbine may be used to compress air which is subsequently used to evacuate the water back into the outside pool, lake, ocean etc. There are few moving parts and so maintenance is kept to a minimum. However, perhaps the machine's greatest advantage is its ability to perform is not dependant on tides or waves. All it requires to operate is a simple pool of stagnant water. This opens the possibility of placing the machine virtually anywhere, enabling it to power everything from large buildings, or a collection of large buildings to small tribal communities in remote parts of the planet.

In the embodiments described, reference is made to providing an auxiliary pressurized fluid supply to supplement the pressurizable fluid supply. The speed at which the water is evacuated from the inner pressure chamber will be dependent in part on the amount of pressure built up in the pressurizable fluid. As a general rule of thumb, the more pressure in the pressurizable fluid, the faster the expulsion of water from inner pressure chamber and the more water will be expelled from the inner pressure chamber. Therefore, the addition of pressurized fluid can be highly effective in ensuring that the water is expelled fast enough from the apparatus to avoid the turbines becoming flooded. In many cases, it has been calculated that the addition of one (1) bar of pressure to the pressurizable fluid will be sufficient to ensure sufficient evacuation of water from the apparatus. Indeed, if desired, the vast majority of the pressurizable fluid may be exhausted from the apparatus to facilitate quick filling of the inner pressure chamber with water and the pressurized fluid may then be sourced predominantly from the auxiliary pressurized fluid supply.

The provision of one bar of additional pressure is relatively simple to achieve with a low cost and low electricity-using compressor. Indeed, it will be possible to provide more pressure if needed with higher rated compressors. If a system is provided in which the compressible fluid is exhausted from the device during filling of the inner pressure chamber with water, it may be necessary to provide a pressurizable fluid supply to the compressors. This could be achieved through a suitable conduit that extends upwardly from the apparatus to a position above the surface of the water in which the device is submerged.

The total electricity derived from the device may be carefully selected and will depend in part on the size of the apparatus, the efficiency of the turbines, the number of the turbines used and the force of the water travelling over the turbines (which in turn will depend in part on the head of water and the distance that the water falls to the turbine). It is envisaged that the apparatus will be immersed in a body of water and will have a depth of water in the region of eight (8) metres above the turbine. The formula for the velocity of the water passing through the cascade in the liquid passageway 23 and exiting the sump 27 is derived by balancing Newton's laws for kinetic and potential energy. The final equation is:

$$m \cdot v^2 = 2 \cdot m \cdot g \cdot H$$

where m is the mass of water, v is the velocity, g is the acceleration due to gravity and H is the height of water.

The pressure exerted by the water in the inner pressure chamber 7 is determined by Newton's Second Law:

$$F = m \cdot a$$

where F is the force exerted by the water, m is the mass of water and a is the acceleration of the water. The pressure of the water is then calculated by:

$$P = F/A$$

where P is the pressure, F is the force exerted by the water and A is the cross-sectional area. According to Pascal's Law, the pressure exerted on the air in the inner pressure chamber 7 of the first part 3 is equal to the pressure exerted by the water between the inner and outer walls for a non-compressible liquid and enclosed system. Water can, to a first approximation, be considered to be a non-compressible liquid and, because, when the water exits the sump 27 there is a constant flow of water, the system can be considered at least partially enclosed. The pressure of the pressurizable fluid supply (air) and consequent volume reduction in the inner pressure chamber 7 is calculated using Boyle's Law:

$$P_1 \cdot V_1 = P_2 \cdot V_2$$

where $P_1$ and $V_1$ are the pressure and volume of the air in the inner pressure chamber 7 initially while $P_2$ and $V_2$ are the corresponding volume of pressure and volume of air after compression by the water. The thrust of the water exiting the Central Plexus is given by $$F = 2 \cdot A[P - P_H]$$

where F is the force, A is the cross-sectional area of the aperture, P is the pressure of the water and $P_H$ is the hydrostatic pressure of the outside water.

It will be understood that various modifications could be made to the apparatus described above without departing from the spirit of the invention or indeed the scope of the appended claims. For example, in the embodiment above, the apparatus is described as a two part apparatus however it could be a single part or indeed more than two main parts. Furthermore, the apparatus casing is preferably constructed from a polymer material although other materials could be used as well as, or instead of, the polymer material. In the embodiments shown, there is always provided a compressor and a compressed air tank however these may not be necessary in some implementations and are deemed optional in some cases. The apparatus will be connected up to an electricity distribution grid which may be the national grid or indeed could be a connection to the supply of an individual building or ship. However although the electrical connections have not been shown for clarity of the drawings, it will be understood that they will be provided. Furthermore, the features of the transformer, compressor and generator/alternator have not been shown as these are standard and would be well understood in the art. it is envisaged that the apparatus may be anchored to the sea bed (if installed in the sea) or could be embedded in the bottom of the body of water using pylons however the fixing means have not been shown as they are not relevant to the patentable aspects of the invention.

In the embodiment shown, the device is an octagonal cylinder in shape however it could be cylindrical, triangular, square, rectangular or other shape and it is not essential to have eight sides and eight turbines. The turbines shown are shown configured vertically about a horizontal axis however they could be configured horizontally or configured vertically but at right angles or a different angle to the orientation shown. In the embodiment shown, there are a plurality of charging inlets and a plurality of discharge outlets although this is not essential and there could be a single charging inlet and/or a single discharge outlet.

In the embodiment shown, the device is operated by sensing the pressure of the pressurizable fluid supply 35. However, a float switch could be provided instead of, or in addition to, one or more pressure sensors to detect the level of the water in the inner pressure chamber. From that, it is possible to determine when the water can be and needs to be evacuated and furthermore one or more float sensors could also be used to determine when the water has been sufficiently evacuated from the inner pressure chamber. The apparatus and method operate equally well in a static pool of water or in free flowing water.

In addition to the foregoing, the apparatus 1 according to the invention could be used as a pump to bail water out of a flooded area. Rather than recycling the water, the discharge aperture(s) could be provided with a conduit such as a flexible length of tubing to lead the water away from the flooded area to a drain or the like. Similarly, the device according to the invention could be used to pump water from the sea bed towards the surface during times of hurricane risk. It is envisaged that by doing so it will be possible to regulate the sea temperature towards the surface thereby reducing the likelihood of such storms forming. Alternatively, it is envisaged that the device according to the invention could be used to propel a water craft or maintain a water craft on station. By being able to selectively open and close the discharge apertures, the thrust from the expelled water could be used to propel a boat along. If there are multiple discharge apertures that are independently operable, the ship could be manoeuvred omni-directionally. This may be particularly useful for large ships attempting to dock.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the claims.

The invention claimed is:

1. A submersible hydroelectric generator apparatus comprising a substantially upright body having an outer chamber and an inner pressure chamber surrounded by and spaced apart from the outer chamber, the inner pressure chamber being in fluid communication with the outer chamber adjacent the lowermost end of the inner chamber, the inner pressure chamber having a pressurizable fluid supply therein, pressurizable by water flowing into the apparatus, the outer chamber having a charging inlet adjacent the top of the upright body, a discharge outlet located adjacent the bottom of the upright body, and a liquid passageway intermediate the charging inlet and the discharge outlet, the liquid passageway having a turbine mounted therein and a flow regulator in the liquid passageway intermediate the turbine and the discharge outlet, and in which there is provided a closure moveable to and from a first position blocking the discharge outlet thereby preventing evacuation of water from the apparatus and a second position opening the discharge outlet thereby permitting evacuation of water from the apparatus, and in which there is provided a controller and a closure actuator capable of moving the closure to and from the first position to and from the second position in response to a control input from the controller.

2. The submersible hydroelectric generator apparatus as claimed in claim 1 in which there is provided an auxiliary pressurized fluid supply to supplement the pressurizable fluid supply.

3. The submersible hydroelectric generator apparatus (1) as claimed in claim 2 in which there is provided a compressor to provide the auxiliary pressurized fluid supply.

4. The submersible hydroelectric generator apparatus as claimed in claim 3 in which the compressor is powered by some of the electricity generated by the turbine.

5. The submersible hydroelectric generator apparatus as claimed in claim 1 in which there are provided a plurality of turbines.

6. The submersible hydroelectric generator apparatus as claimed in claim 5 in which there are provided a plurality of liquid passageways, each having a turbine therein.

7. The submersible hydroelectric generator apparatus as claimed in claim 5 in which the plurality of turbines are spaced circumferentially around the outer chamber.

8. The submersible hydroelectric generator apparatus as claimed in claim 1 in which the flow regulator comprises a sump located in the liquid passageway below the turbine.

9. The submersible hydroelectric generator apparatus as claimed in claim 1 in which the flow regulator comprises a valve operable to selectively block passage of water through the liquid passageway.

10. The submersible hydroelectric generator apparatus as claimed in claim 1 in which there is provided a turbine mounted in line with the discharge outlet of the apparatus.

11. The submersible hydroelectric generator apparatus as claimed in claim 1 in which there is provided a ram mounted in the inner pressure chamber operable to evacuate water from the apparatus.

12. The submersible hydroelectric generator apparatus as claimed in claim 11 in which the ram is powered by some of the electricity generated by the turbine.

13. The submersible hydroelectric generator apparatus as claimed in claim 1 in which there is provided a pressure sensor in communication with the controller, the pressure sensor being operable to measure the pressure of the pressurizable fluid supply in the inner pressure chamber.

14. The submersible hydroelectric generator apparatus as claimed in claim 1 in which the apparatus comprises a two-part construction:
the first part comprising the inner pressure chamber and a substantial portion of the outer chamber including the discharge outlet and a portion of the liquid passageway that is in communication with the discharge outlet;
the second part being releasably detachable from the first part and containing the charging inlet, the turbine and a portion of the liquid passageway that is in communication with the charging inlet;
both the first part and the second part each having a linking aperture therein for communication with the linking aperture of the other of the first and second part to connect the portions of the liquid passageway together and complete the fluid passageway.

15. The submersible hydroelectric generator apparatus as claimed in claim 1 in which the apparatus is constructed predominantly from a polymer material.

16. The submersible hydroelectric generator apparatus as claimed in claim 1 in which there is provided a release valve in the inner pressure chamber to allow evacuation of at least some of the pressurizable fluid supply from the inner chamber.

17. The submersible hydroelectric generator apparatus as claimed in claim 16 in which there is provided a tank connected to the release valve to receive the pressurizable fluid supply evacuated from the inner pressure chamber.

18. The submersible hydroelectric generator apparatus as claimed in claim 17 in which the tank is located intermediate the inner pressure chamber and the outer chamber.

19. The submersible hydroelectric generator apparatus as claimed in claim 1 in which there is provided a pressure vessel operable to promote flow of a fluid through the apparatus.

20. The submersible hydroelectric generator apparatus as claimed in claim 1 in which there is provided a turbine adjacent the discharge outlet.

21. Use of the submersible hydroelectric generator apparatus as claimed in claim 1 as a pump to pump a liquid from one location to another.

22. Use of the submersible hydroelectric generator apparatus as claimed in claim 1 as a propulsion device to propel a waterborne craft from one location to another.

* * * * *